United States Patent [19]
Hemes

[11] Patent Number: 6,092,763
[45] Date of Patent: Jul. 25, 2000

[54] AIRCRAFT CRASH DAMAGE LIMITATION SYSTEM

[75] Inventor: David J. Hemes, Green Bay, Wis.

[73] Assignee: David John Hemes, Green Bay, Wis.

[21] Appl. No.: 09/201,986

[22] Filed: Dec. 1, 1998

Related U.S. Application Data

[60] Provisional application No. 60/069,901, Dec. 17, 1997.

[51] Int. Cl.$^7$ .............................. B64F 1/00; B64C 25/68
[52] U.S. Cl. ................................ 244/114 R; 244/110 E
[58] Field of Search .................... 244/63, 110 E, 244/110 F, 110 R, 114

[56] References Cited

U.S. PATENT DOCUMENTS

| | | | |
|---|---|---|---|
| 2,351,002 | 6/1944 | Burton | 244/114 R |
| 2,358,426 | 9/1944 | Tompson | 244/114 R |
| 2,850,252 | 9/1958 | Ford | 244/114 R |
| 3,128,066 | 4/1964 | Bailey | 244/114 R |
| 3,490,722 | 1/1970 | Schnarr | 244/114 R |
| 3,567,159 | 3/1971 | Klein | 244/114 |
| 4,653,706 | 3/1987 | Ragiab | 244/110 |
| 5,170,966 | 12/1992 | Sheu | 244/110 |
| 5,560,568 | 10/1996 | Schmittle | 244/48 |

*Primary Examiner*—Peter M. Poon
*Assistant Examiner*—Francis T. Palo

[57] ABSTRACT

A runway (21) is used to retrieve aircraft from the skies. During an emergency landing (57), an aircraft crash damage limitation system is deployed from a heated underground storage area (12, 22 and encircled H). A pair of parallel guide tracks (52) lift from bunkers (12 and 22) along the edge of the runway (21) and an aircraft recovery unit (18) is deployed from an apparatus storage area (12) at the approach. The guide tracks (52) provide nozzles (46) for complete runway foaming. Guide tracks (52) are further supported in deployment by a guide track retaining wall (64). The aircraft recovery unit is charged with fire suppressant agents (encircled F) and is locked into the guide tracks (52). A locking and acceleration/braking method is contained in magnetic flux bars (44 and 66). The aircraft recovery unit (18) is signaled to effect an air speed to ground speed match with the incoming distressed aircraft (57) by a control center (encircled E). An aircraft recovery locator (EL) is mounted on the aircraft recovery unit (18) to signal aircraft position. A winch and cable backup propulsion/braking apparatus is provided by a means in the aircraft crash damage limitation system. The aforementioned capture system can operate in reverse for additional flexibility of deployment. Capture cells (42) cushion the aircraft (57) upon landing on the aircraft recovery unit (18). Capture cells (42) centered on the center, top of the aircraft recovery unit (18) are employed to foam (encircled FC) the fuselage exterior. A means is provided to either deplane passengers and crew at the final braking site or to tow the aircraft and recovery unit combination to a secondary location. The recovery system is then serviced after an event and returned to stand-by status in bunkers (12 and 22).

14 Claims, 11 Drawing Sheets

AIRCRAFT CRASH DAMAGE LIMITATION SYSTEM

CROSS-REFERENCE TO RELATED APPLICATIONS

This application claims the benefit of Provisional Patent Application Ser. No. 60/069,901, filed Dec. 17, 1997.

BACKGROUND

1. Field of Invention

This invention relates to increasing aircraft safety during emergency landings, specifically to an improved system of aircraft capture, fire suppression and braking via strict movement control during the event.

2. Description of Prior Art

It is increasingly common for aircraft to make emergency landings due to various factors. Some common events include: hydraulic failure which can dramatically reduce control of an aircraft, landing gear deployment failure and fire involving either interior or exterior fuselage components. During these emergencies, it is imperative that the incoming aircraft be greeted with a landing system employing as many safety features as can be assembled.

For a great number of years, the only options that have been available as a matter of practice are hard landings (aircraft vs. runway) and foaming of the runway surface. These contain significant drawbacks as fuselage damage occurs and the consequent sparking produces fires. Over the course of the past few years, other devices have been proposed. U.S. Pat. No. 4,653,706 to Ragiab (1987) shows a rolling bed propelled by battery power. There is a significant need for a number of batteries, which create acceleration drag. The system is also operated by remote control which is weather-bound. The system may be unable to deploy when rain or snow reduces visibility to near zero. There is also a significant possibility of the capture unit leaving the runway surface as the tires can slide on a slippery runway. Attempting to deploy such a system in high wind can create difficulties in getting said unit to the desired runway.

Another aircraft landing safety system embodied in U.S. Pat. No. 5,170,966 to Sheu (1992) shows a system operated in dedicated space. There is significant loss of landing area with such a system. Airport runway use is restricted by taking a strip of land out of service for this landing system. It is also restricted for use by weather conditions. Snow and ice can seize the exposed rollers designed to move the sled forward and perform consequent braking functions. An all-weather system is necessary to be effective in emergency landing situations all over the world.

Other systems include cables stretched across a runway surface with the purpose of snagging an aircraft to bring it to a stop. This creates a severe jolt for both passengers and the aircraft structure. The result can be injury and catastrophic damage to the aircraft. A U.S. Pat. No. 5,560,568 by Schmittle (1996) details a specially designed aircraft that can land vertically on an air bag. This is a specific method of landing an aircraft that is not practical for existing aircraft in that it would require tremendous aircraft redesign. The expense would be prohibitive.

The aircraft emergency landing systems named heretofore and others from the past suffer from a number of disadvantages:

(a) Prior systems developed are restricted to fair weather operation. Airports located in northern climates require an emergency landing system that can operate in severe cold and in ice and snow conditions.

(b) Some systems require the use of space that eliminates the use of such space for normal runway operations. Airports in many areas are strapped for land use and can not take an area out of service.

(c) The use of any system that does not take into account the force of physics on an aircraft landing at an angle can cause the system to leave a runway surface. This can produce injury to passengers and aircraft damage; the very problems that the system seeks to correct.

(d) Fire suppression on other systems is limited to the runway surface. An aircraft landing upon a sled of some type may need immediate fire suppression upon the aircraft exterior. The time that passes between aircraft recovery and movement cessation is time that can be used to extinguish engine fires.

(e) The capture of an aircraft potentially weighing 80 tons plus requires rapid acceleration and braking of the recovery unit. Systems that require the aircraft to strike a stationary system first or that require a long runway acceleration period for the recovery unit place the mission in jeopardy. Matching incoming aircraft speed to recovery unit ground speed is critical.

OBJECTS AND ADVANTAGES

Accordingly, several objects and advantages of my invention are as follows:

(a) to provide an emergency landing system that is fully operational in all weather conditions;

(b) to provide stability in the recovery and braking of an aircraft landing under emergency circumstances;

(c) to provide exceptional speed and braking forces to capture and brake an aircraft making an emergency landing;

(d) to provide fire suppression to the exterior of an aircraft during the critical moments between aircraft capture and completed braking;

(e) to provide an emergency landing system that allows for the normal operation of the runway in which it is installed and yet, maintain the ability for immediate emergency deployment;

(f) to provide a means for aircraft to recovery unit contact that is aided by instrumentation for landing accuracy;

(g) to provide a backup propulsion and braking system for additional operational safety;

(h) to provide a system of recovery cells on the surface of the recovery unit that can maintain critical aircraft stability upon aircraft capture despite damage to cells.

Further objects and advantages are to deploy an aircraft crash damage limitation system that takes into account the myriad of problems that can surface during an emergency landing. This system is designed to offer protection for the situations that can not be readily anticipated. Still other objects and advantages will become apparent from a consideration of drawings and ensuing description.

DRAWING FIGURES

The following drawing descriptions contain a brief explanation of their purpose.

Reference Numerals In Drawings

| | | | |
|---|---|---|---|
| F | foaming hardware center | W | winch |
| E | electrical main | EC | environmental control center |
| G | gas compression/vacuum | EC1 | environmental control piping |
| H | bunker heating system | CG | compressed gas cylinder/controls |
| FC | fuselage collar foaming control | EL | aircraft recovery locator |
| W1 | aft winch right | W2 | aft winch left |
| W3 | forward winch right | W4 | forward winch left |
| W5 | recovery unit deployment winch | | |
| 12 | apparatus equipment area | 13 | aft deployment hatch |
| 14 | guide track hatch | 18 | aircraft recovery unit |
| 20 | recovery unit storage base | 21 | runway surface |
| 22 | track storage bunker | 24 | recovery unit deployment cable |
| 25 | continuous loop cable | 27 | aft recovery unit deployment pulley |
| 28 | forward recovery unit pulley | 32 | aircraft recovery unit hinge |
| 34 | aft hatch lift cylinders | 38 | guide track lift cylinders |
| 40 | obstruction deflector | 42 | capture cells on recovery unit |
| 44 | magnetic flux acceleration/braking | 45 | additional magnetic guide space |
| 46 | foam application nozzle | 48 | pneumatic pressure/vacuum hoses |
| 52 | guide track | 53 | track section joint |
| 54 | lift cylinder attachment collar | 56 | guide track retaining wall |
| 57 | incoming distressed aircraft | 60 | reverse operation fuselage collar |
| 62 | forward operation fuselage collar | 64 | track retaining method |
| 65 | pneumatic shock absorber | 66 | magnetic flux base |
| 67 | wheel assembly swivel joint | 69 | foam disbursement cells |
| 72 | pneumatic ramp controls | 74 | cell deflation connection |
| 75 | crossover ramp | 80 | pressurizing of lift recovery unit |

SUMMARY

An aircraft recovery unit is bunkered along the edges of a runway for rapid deployment in the event of an aircraft emergency landing situation. Aircraft capture, braking and fire suppression is provided simultaneously.

DESCRIPTION—FIGS. 1 to 11

Figure 6:
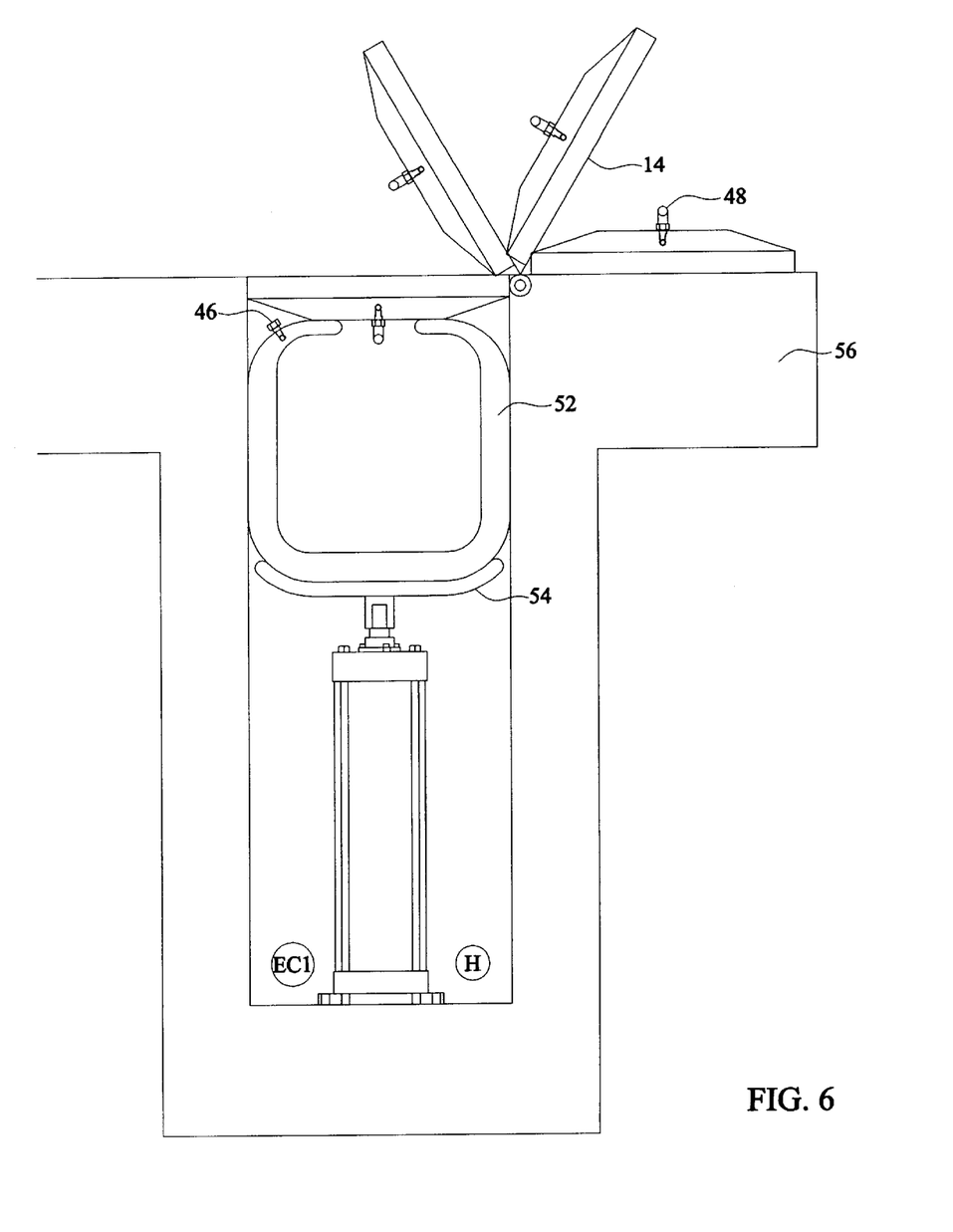
FIG. 6 shows a rear view of the guide track bunker and guide track hardware systems.
Figure 7:
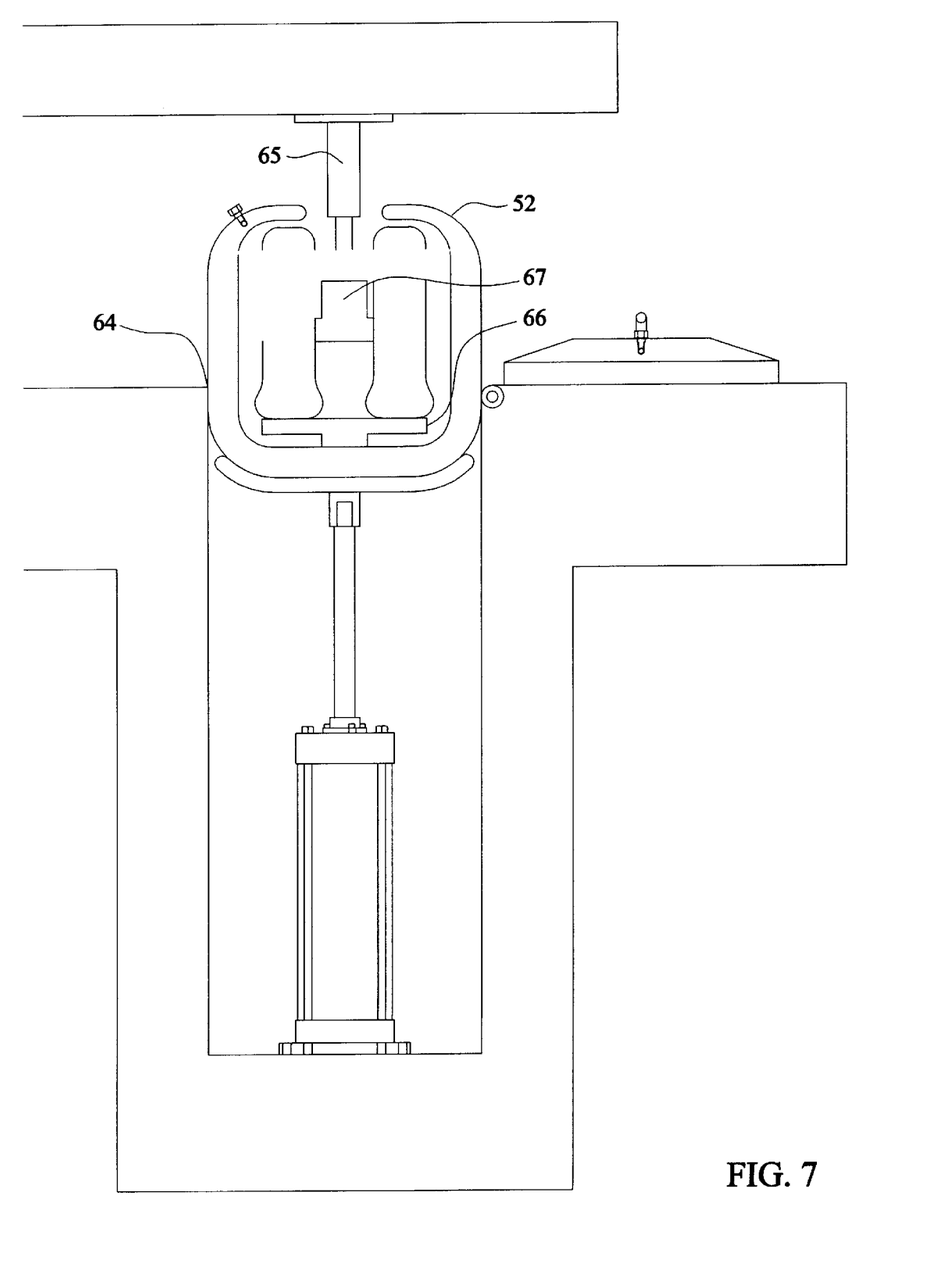
FIG. 7 shows a rear view of the aircraft recovery unit meeting its guide track assembly.
Figure 8:
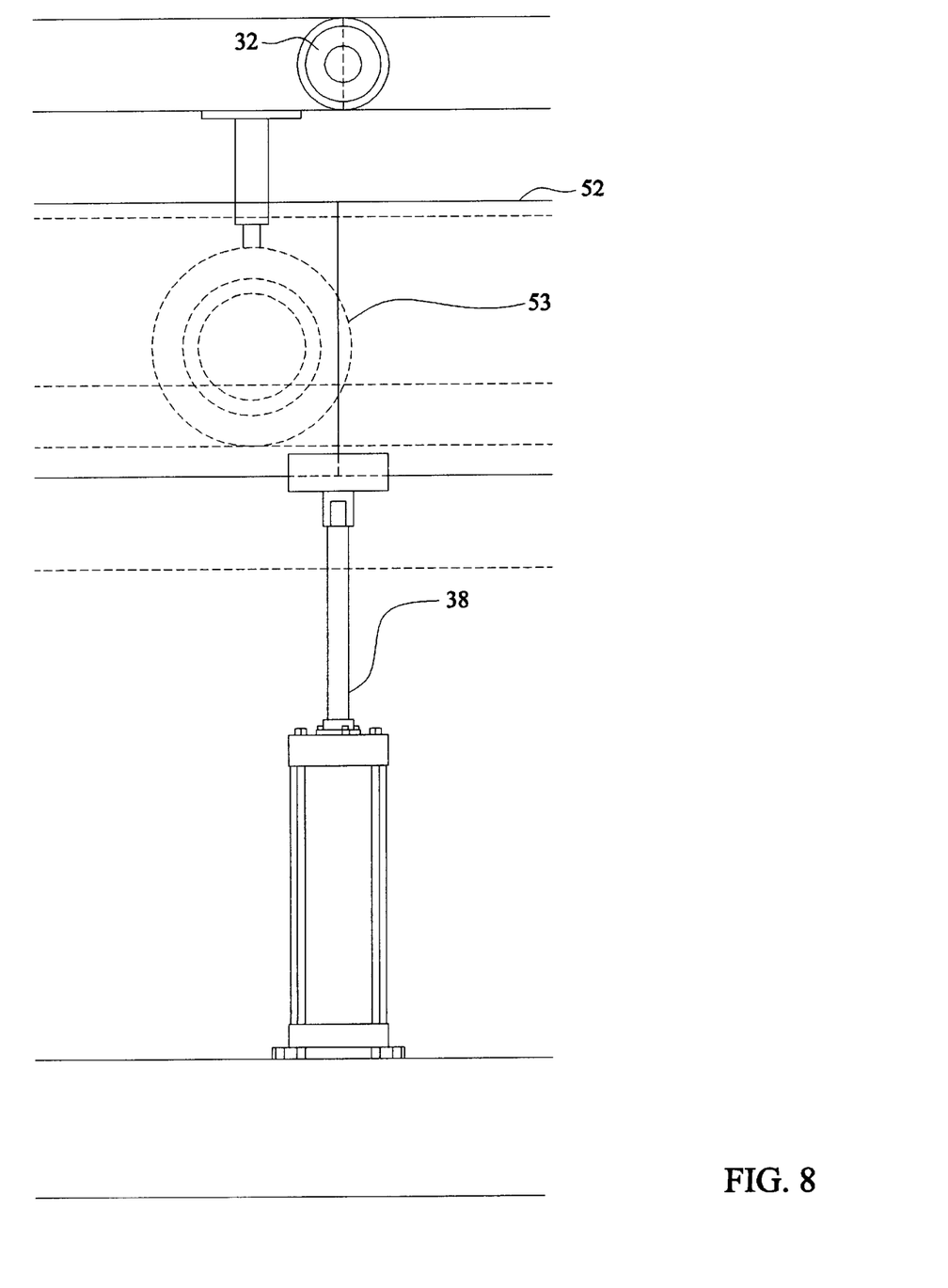
FIG. 8 shows a side view of the aircraft recovery unit being guided by the track assembly.
Figure 9:
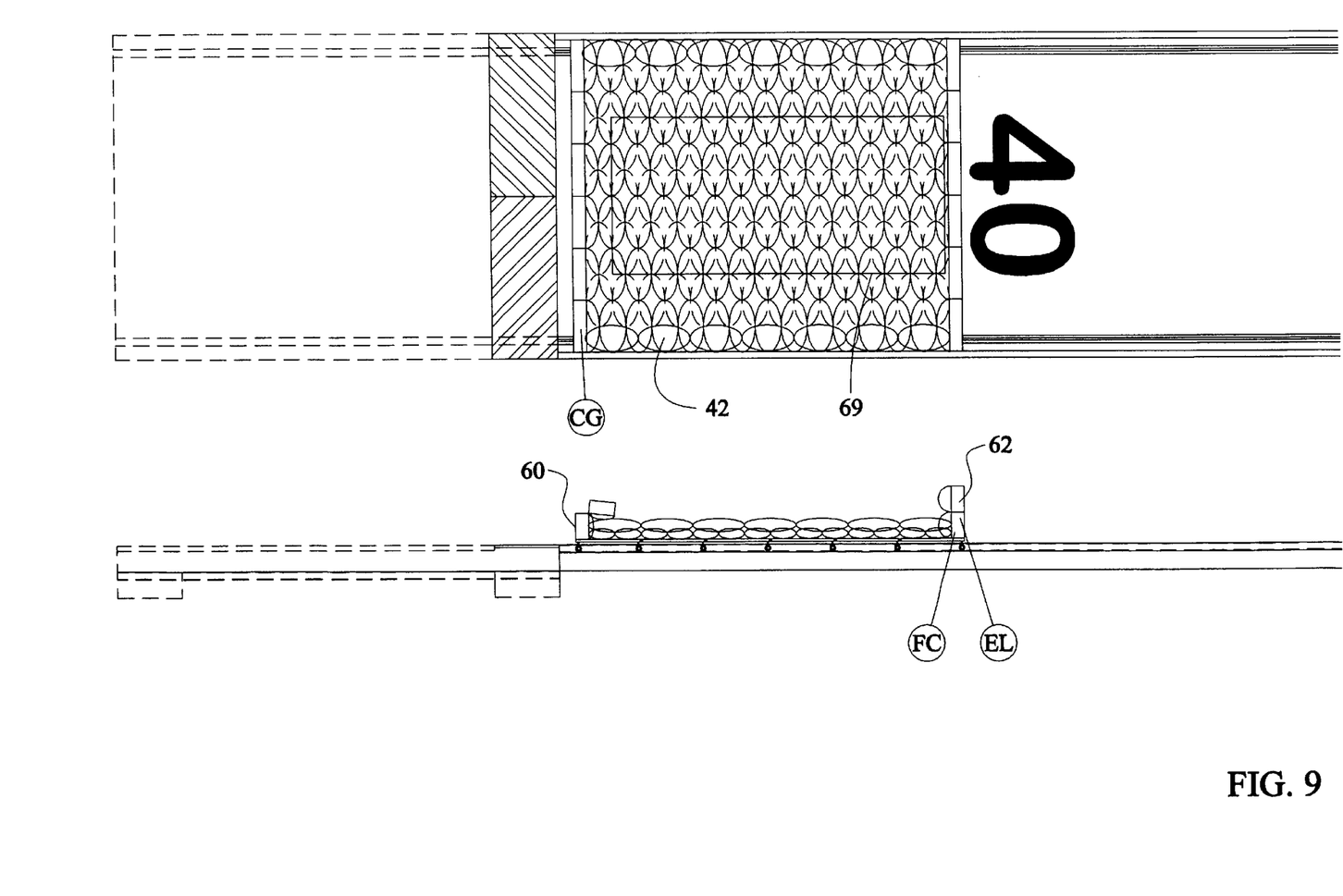
FIG. 9 shows top and side views of the aircraft recovery unit cells inflated and ready for aircraft reception.
Figure 10:
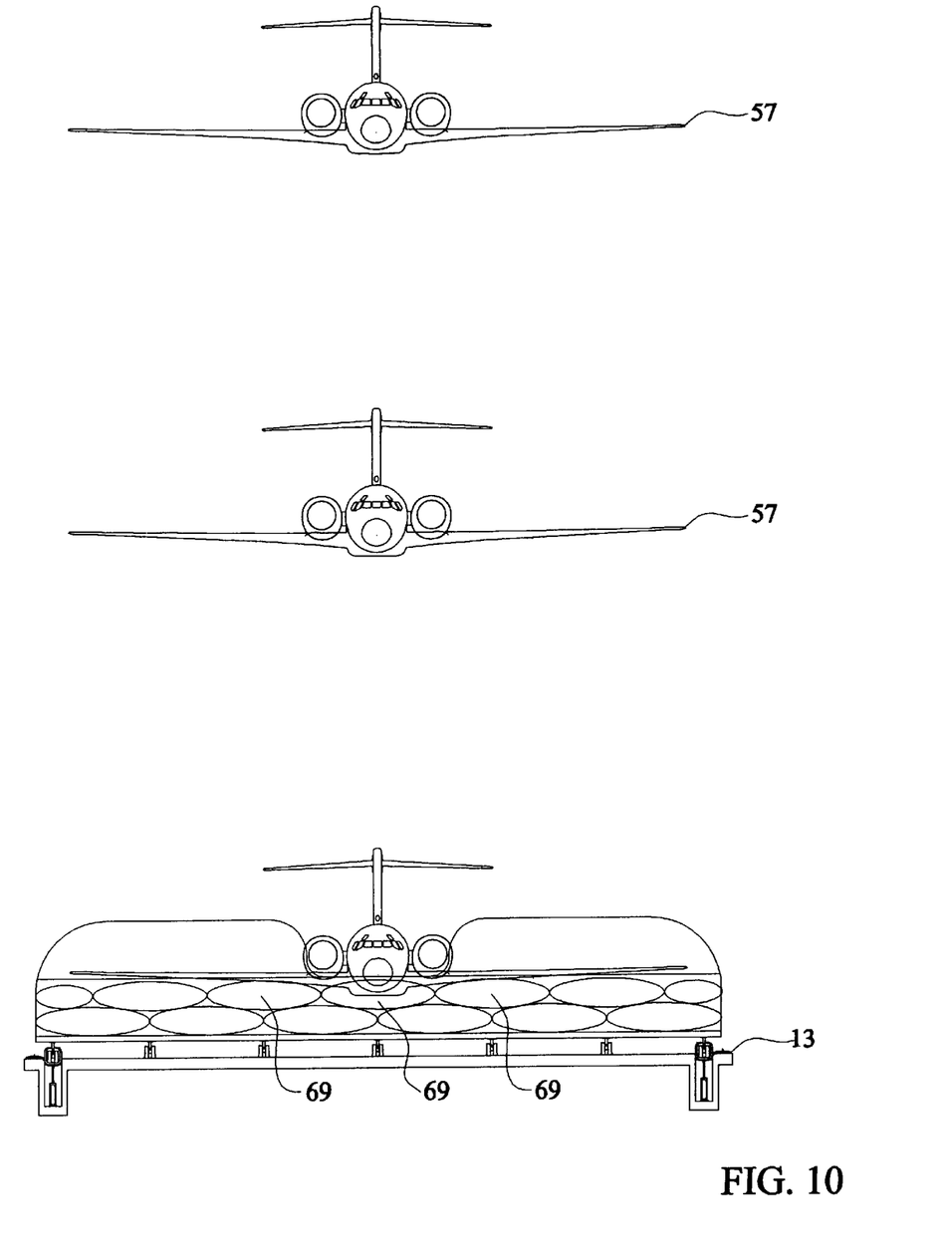
FIG. 10 shows the flight path of an aircraft making an emergency landing and its capture upon the aircraft recovery unit.
Figure 11:
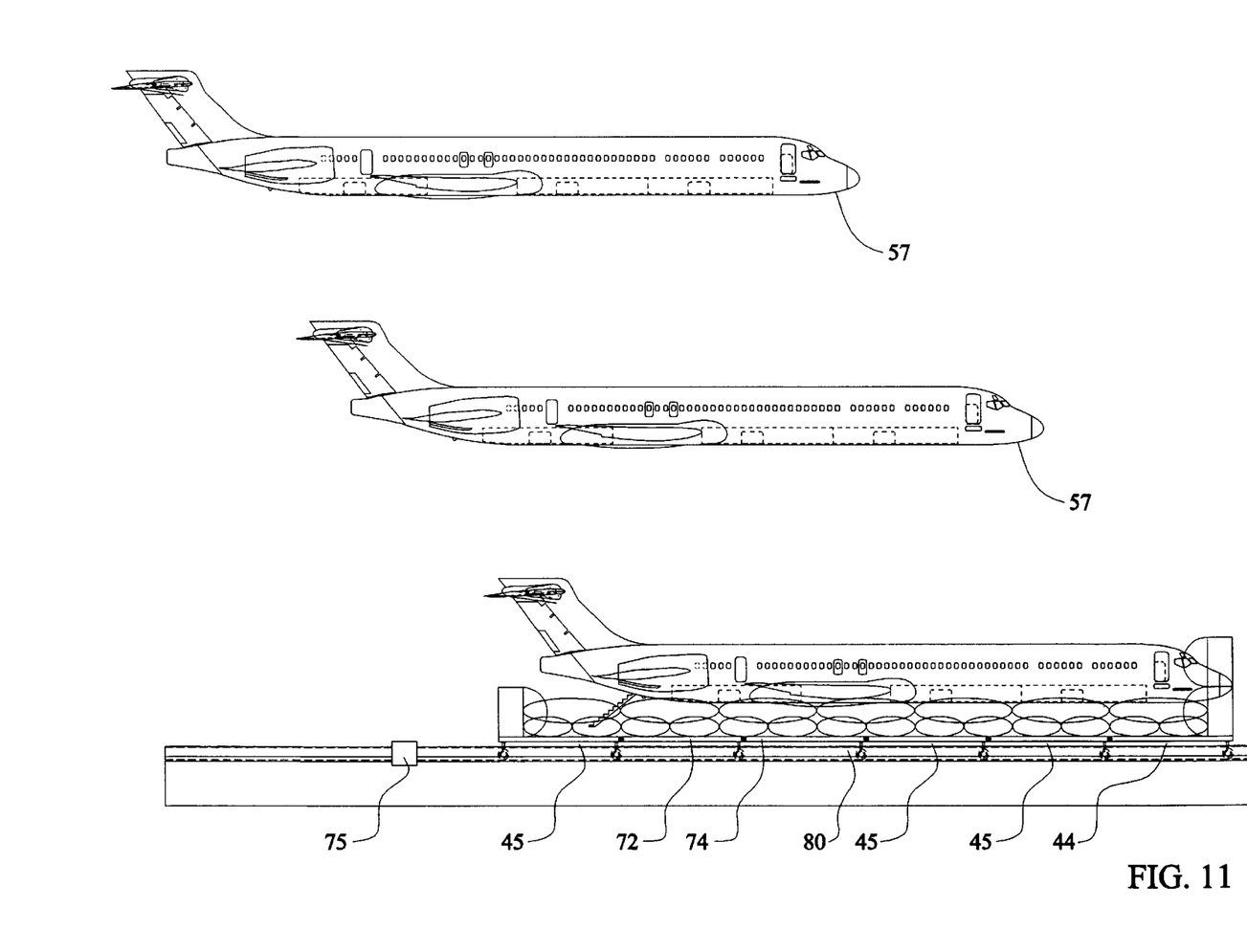
FIG. 11 shows a side view of the flight path of an aircraft making an emergency landing and its capture upon the aircraft recovery unit.

FIGS. 1 to 5 will show both top and side views of an aircraft crash damage limitation system. These also show a view of one side of the apparatus as it is stored to be readied for use, but it is also a mirror image of the other side. FIGS. 6 to 8 illustrate a guide track 52 for an aircraft crash damage limitation system and the associated hardware necessary for its operation. FIG. 9 shows an aircraft recovery unit 18 in a fully deployed mode and FIGS. 10 and 11 illustrate an incoming aircraft in distress 57 coming to meet an aircraft recovery unit 18.

Figure 1:
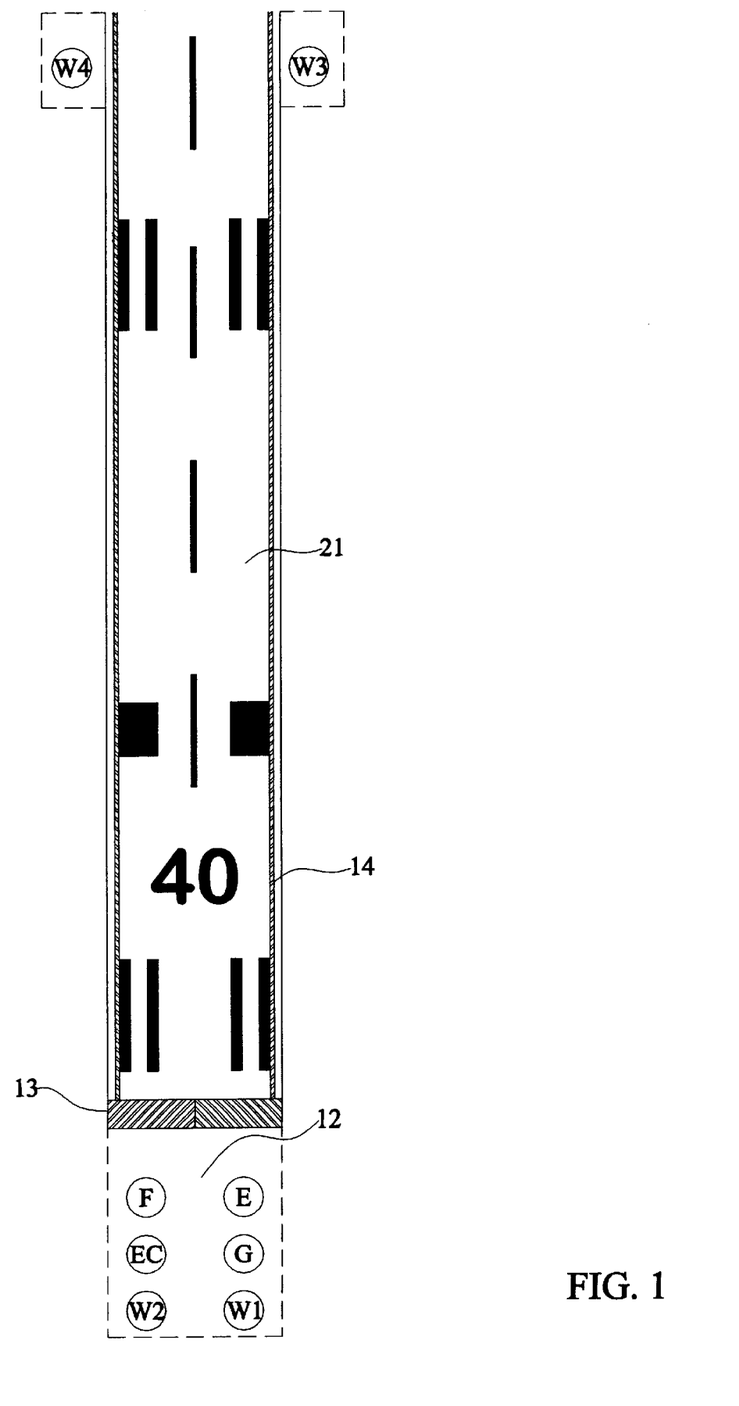
FIG. 1 shows a top view of a runway containing this aircraft crash damage limitation system.

An overhead view of an aircraft crash damage limitation system is provided in FIG. 1. A guide track hatch 14 runs the length of each side of the runway 21 and is constructed of aluminum in its preferred embodiment or another lightweight material of similar strength. The guide track hatch must be sturdy enough to hold the weight of an aircraft running across same during non-deployment. This is accomplished via reinforcement struts (not shown). An aft deployment hatch 13 is to be constructed of like material. This area too can be subjected to aircraft landing forces during non-deployment. The guide track hatch 14 will be divided into sections at intervals of several feet as will the guide track 52 to promote easier maintenance of the sections. The guide track hatch 14 will contain pressurizing and vacuum hoses 48 on its underside as indicated in FIG. 6.

In addition to the area where the guide track 52 (FIG. 6) is stored in a guide track retaining wall 56, there is an apparatus equipment area 12 at the approach of the runway 21. An approach bunker 12 contains space for an aircraft recovery unit 18 (FIG. 2) and several operational devices: foaming hardware center (encircled F), electrical main (encircled E), gas compressor/vacuum suction (encircled G), aft winch left (encircled W2), aft winch right (encircled W1) and environmental control center (encircled EC). An environmental control piping system (encircled EC1) recovers fluid from bunker areas (12, 22) and deposits said fluid into a holding area away from runway 21. A bunker area is also provided at the opposite end of the runway for forward winch left (encircled W4) and forward winch right (encircled W3).

All equipment for deployment of an aircraft crash damage limitation system is enclosed within the various bunkers 22 and 12 with the exception of computer hardware for aircraft and control tower use in signaling the deployment. All bunker areas are to be constructed of reinforced concrete or a similar substance for superior protection of the system. FIG. 6 shows a bunker heating method (encircled H).

The guide track 52 associated with deployment of an aircraft recovery unit 18 will be constructed of lightweight aluminum or of a metal to provide similar qualities. The guide track 52 will contain foaming nozzles 46 spaced every few feet to the runway side to provide a means of foaming the runway surface 21. The guide track 52 is attached to its guide track lift cylinders 38 by a lift cylinder attachment collar 54 (FIG. 6). The guide track 52 is further supported in an operational position by a track retaining method 64 as illustrated in FIG. 7. Track section joints 53 are supported by tongue and groove connections in the track ends (not shown) and by bolts from underneath by lift cylinder attachment collar 54. Bolts attaching a lift cylinder attachment collar 54 to a guide track 52 will not protrude beyond the interior surface of guide track 52 and will serve to connect track sections securely (FIG. 6).

Figure 2:
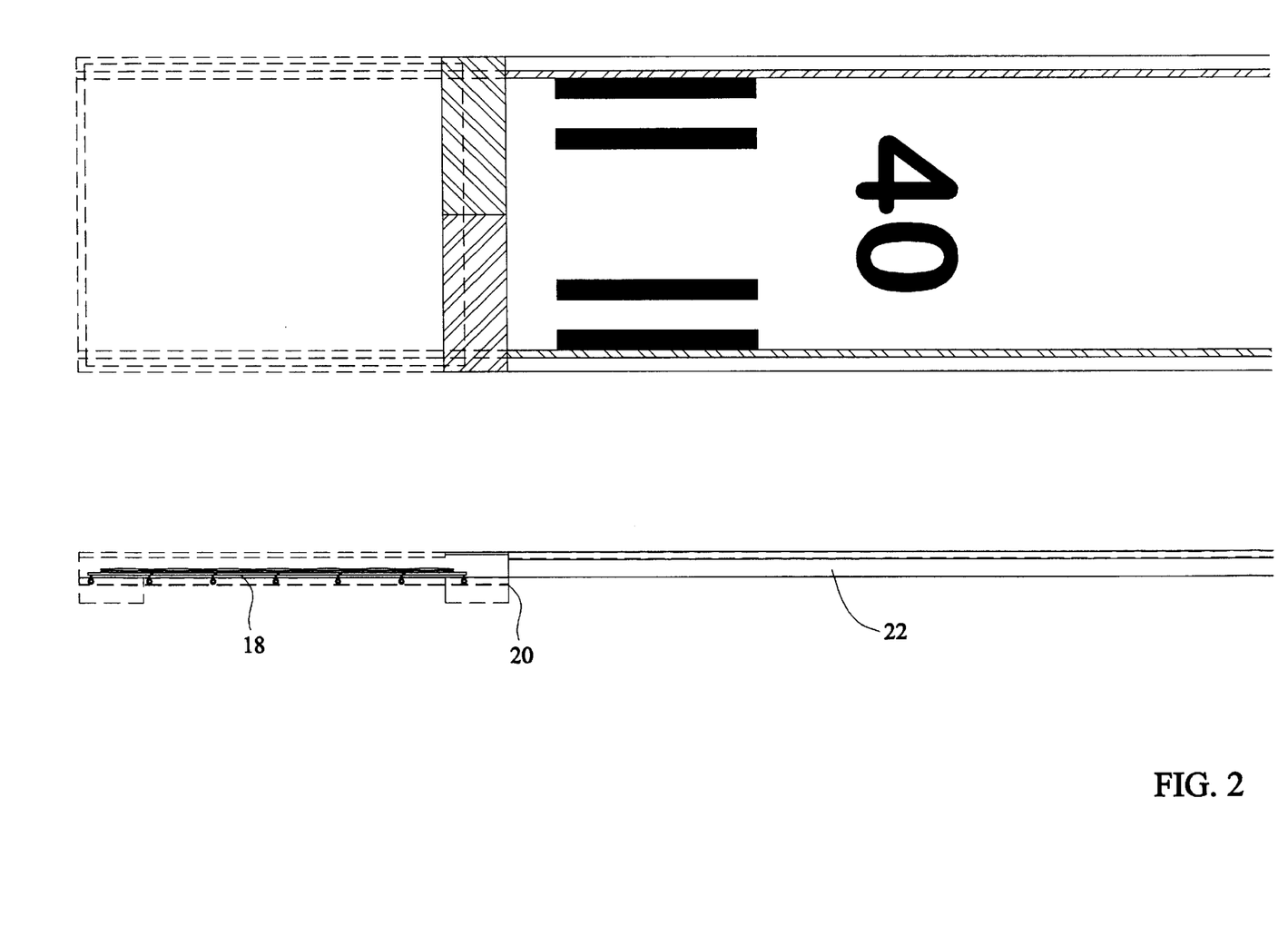
FIG. 2 shows both top and side views of the recovery system with the recovery unit in its stored position.

An aircraft recovery unit 18 is stored in a deflated state in the approach bunker 12. The guide track 52 is stored in a track storage bunker 22. A guide track hatch 14 is hinged along an edge away from the runway 21 edge. The guide track 52, is lifted by the guide track lift cylinders 38, which are mounted under the guide track 52. FIG. 2 shows the area where the aircraft recovery unit 18 is stored on recovery unit storage base 20.

Figure 3:
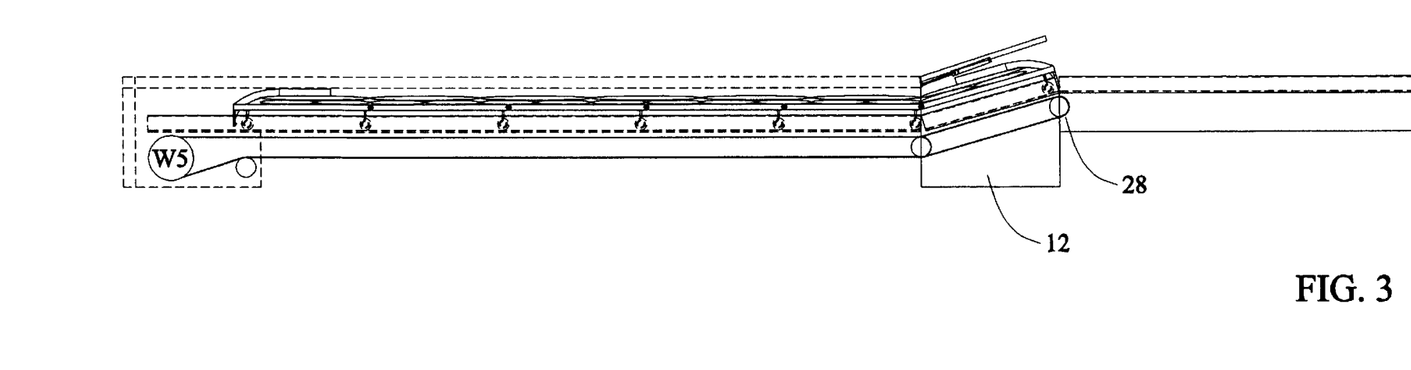
FIG. 3 shows a side view of the aircraft recovery unit being deployed from the aft system bunker.
Figure 3A:
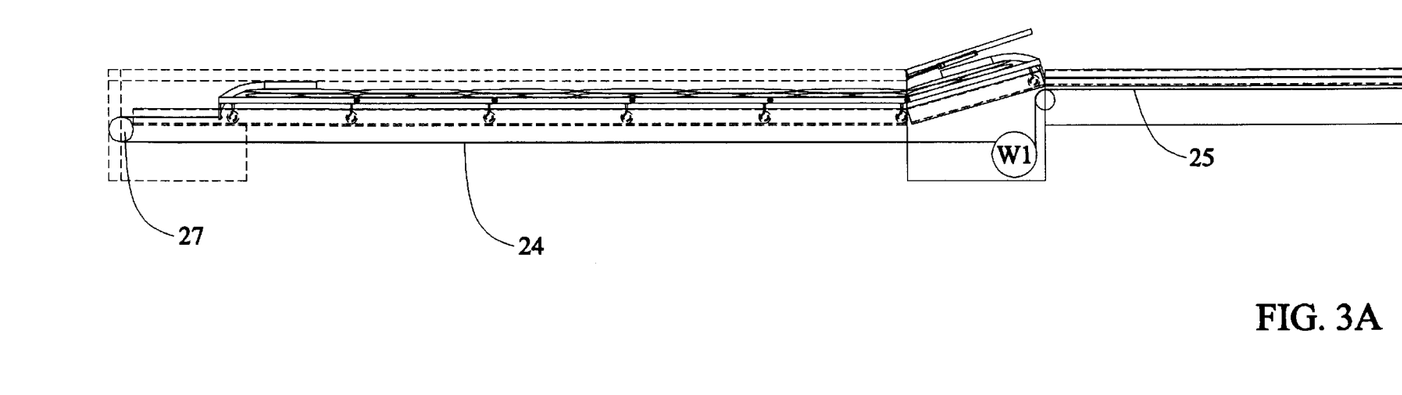
FIG. 3A shows additional detail to FIG. 3.

FIG. 3 displays a side view of an aircraft crash damage limitation system. An apparatus equipment area 12 is below the area where the aircraft recovery unit 18 is deployed. A means for effecting deployment of an aircraft recovery unit 18 is embodied in recovery unit deployment winch (encircled W5). A recovery unit deployment cable 24 is also displayed in FIG. 3. This circulates at the runway 21 edge on a forward recovery unit pulley 28. The illustration of FIG. 3A shows an aft recovery unit deployment pulley 27 for use with recovery unit deployment cable 24. The source of movement to deploy the aircraft recovery unit 18 along a runway 21 is embodied in aft winch right (encircled W1). This is a backup means of propulsion for the system. It is mirrored by aft winch left (encircled W2) and forward winch left (encircled W4). In support, a continuous loop cable 25 is provided to propel and brake an aircraft recovery unit 18 along a runway surface 21 and in a guide track 52. The guide track 52 and bunker systems are mirrored on each side of a runway 21, as is the associated hardware.

In FIG. 3A, a continuous loop cable 25 is attached to an aircraft recovery unit 18 for the purpose mentioned. A continuous loop cable is routed through the guide track 52 with the cable return made under the guide track 52 via cable guides (not shown). Should this backup cable system be deployed in installation, an obstruction deflector 40 is provided on the aircraft recovery unit 18 as listed on FIG. 4.

Figure 4:
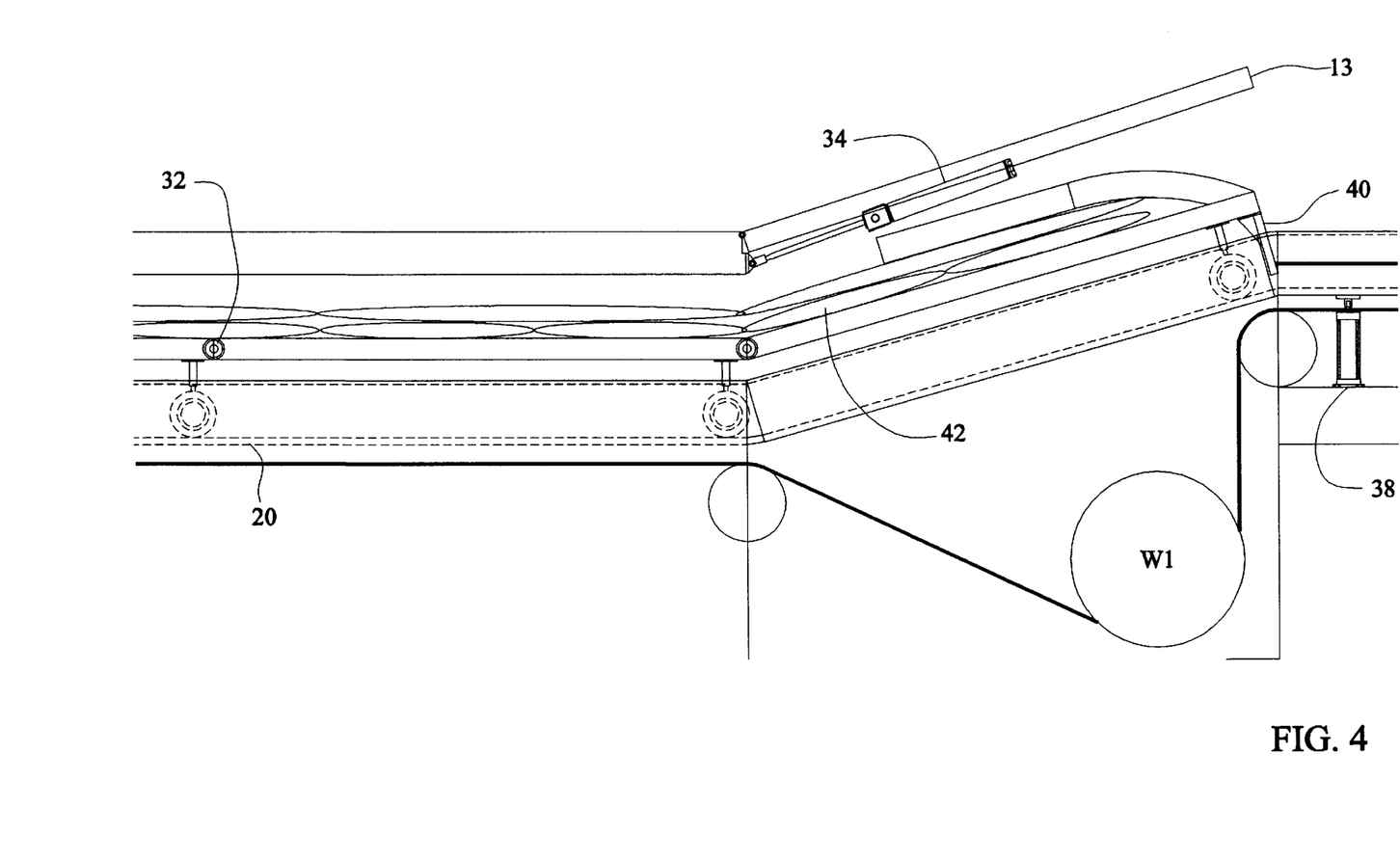
FIG. 4 shows a side view of the machinery necessary for recovery unit deployment.

FIG. 4 (zoom image of aft bunker) shows an aircraft recovery unit 18 being deployed from its storage area. The aircraft recovery unit 18 is constructed of lightweight aluminum I-beams in its preferred embodiment with other metals serving a potentially equal purpose. The aircraft recovery unit 18 is to be constructed by length and width as the need indicates. The preferred size is a length of one hundred and fifty feet with the width to traverse the distance between the outer guide track bunker edges 56 and the width of the runway 21 itself. The aircraft recovery unit 18 will be hinged 32 at equal intervals along the length to allow for articulation in its deployment from the apparatus equipment area 12. The aircraft recovery unit 18 will be covered with puncture proof (or puncture resistant) capture cells 42. A cell will either accept a non-toxic inert gas or fire suppressing foam, depending on its location on an aircraft recovery unit 18. The top, center three rows (variable) with foam disbursement cells 69 (FIG. 9) will be filled with fire suppressing foam. Capture cells 42 will be inflated via one-way valves of a predetermined pressure rating and in groups of four by preferred embodiment.

An aircraft recovery unit 18 is exiting the apparatus equipment area 12 in FIG. 4. The aft deployment hatch 13 is lifted by heavy duty aft hatch lift cylinders 34 (pneumatic or hydraulic as an option with all system components). The cylinders are spaced at intervals to allow the easy lifting of the reinforced aft deployment hatch 13.

The aircraft recovery unit 18 will roll from its aft apparatus equipment area 12 on aircraft grade tires as shown on FIG. 4. A tire assembly will consist of dual tires with a wheel assembly swivel joint 67 (FIG. 7). A pneumatic shock absorber 65 will support an aircraft recovery unit 18 in order to receive an aircraft in distress 57. All tires located under an aircraft recovery unit 18 will mirror similar construction. Tire assemblies will be spaced under an aircraft recovery unit 18 so as to equally support and distribute all weight associated with its operation.

Upon deployment, the aircraft recovery unit 18, will have a forward operation fuselage collar 62 raise into its aircraft capture position. It contains a semicircular notch at its center for fuselage stabilizing on contact and a series of nozzles for fuselage collar foaming control (encircled FC). The fuselage collar also allows air flow for aircraft landing stability over the aircraft recovery unit 18. For reverse operation where the aircraft recovery unit is taken to a position opposite of the initial deployment position, a reverse operation fuselage collar 60 is provided with the identical system operations of a forward operation fuselage collar 62 (FIG. 9). An aircraft recovery locator (encircled EL) is located upon an aircraft recovery unit 18. A compressed gas cylinder/controls device (encircled CG) is mounted at the reverse operation fuselage collar 60 area for access to rescue personnel to deploy the reverse system collar 60.

Figure 5:
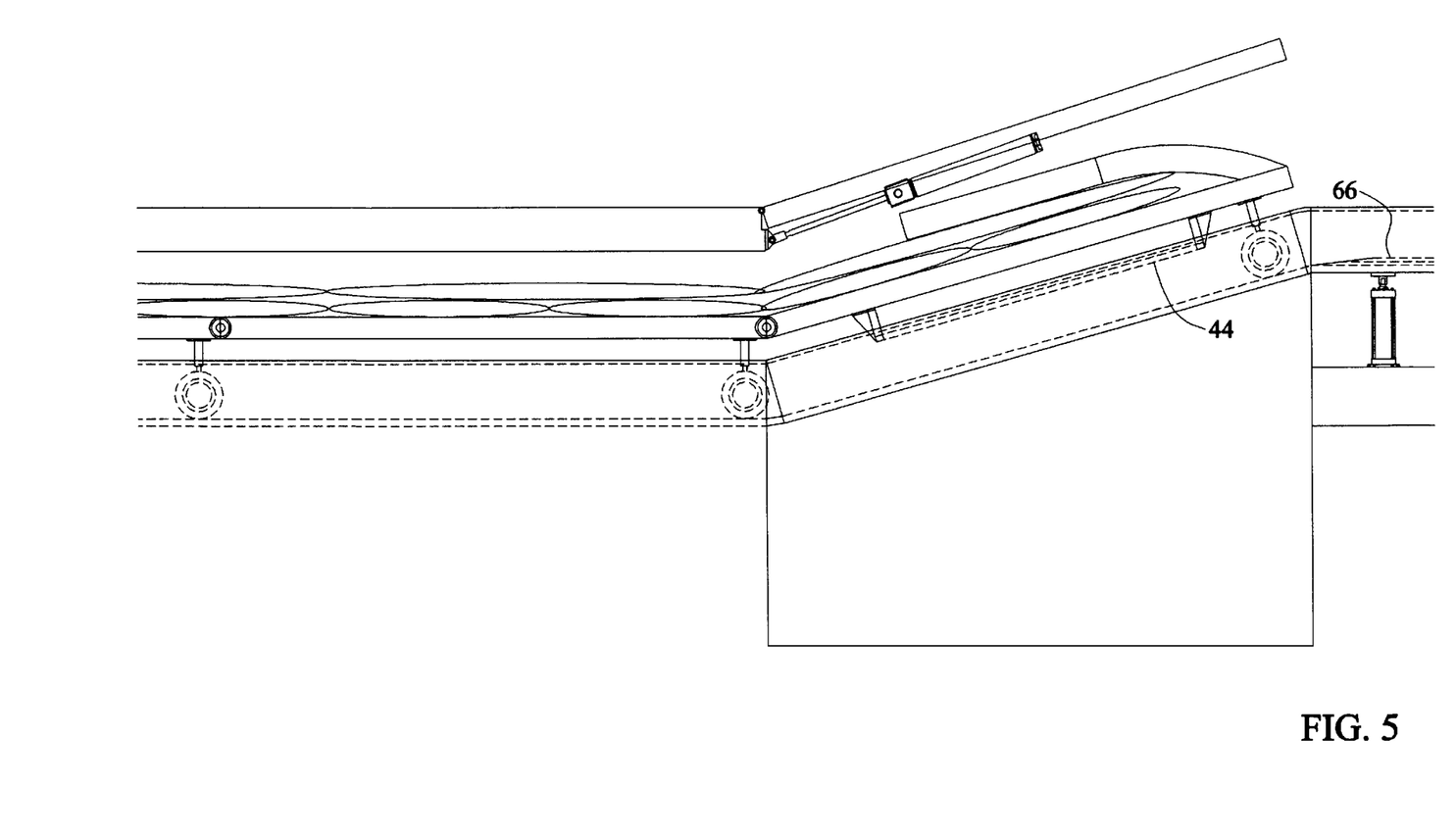
FIG. 5 shows a side view of guide track deployment and acceleration means.

When the aircraft recovery unit 18 enters the guide track 52, a magnetic flux acceleration/braking system 44 is engaged as given in FIG. 5. A magnetic flux acceleration/braking bar 44 is mounted under an aircraft recovery unit 18 and is joined with a magnetic flux base 66. FIG. 7 (rear view) shows a magnetic flux base under a tire assembly. This is the preferred embodiment of propulsion and braking of the aircraft crash damage limitation system. The current magnetic flux technology as provided with roller coaster systems is of premium use in this system. The magnetic flux base 66 is constructed in sections to match the guide track sections 52 for removal and maintenance. The magnetic flux acceleration/braking system 44 is lowered from the base of an aircraft recovery unit by pneumatic system (not shown) and secured over the base. At the end of deployment, the magnetic flux accelerating/braking bars 44 can be raised out of the way by lift pressurizing of the pneumatic flux bar deployment hardware (not shown).

The FIGS. 10 and 11 display an incoming aircraft in distress 57. The aircraft recovery unit 18 is shown receiving the aircraft. Additional space for magnetic flux acceleration/braking bars 44 is shown by additional magnetic guide space 45. These areas are optional depending on the potential weight of aircraft to be landed during emergencies and the size of an aircraft recovery unit 18 designed for that runway space.

Other aircraft recovery unit 18 features are illustrated on FIG. 11 where pneumatic ramp controls 72 are mounted. The passenger exit ramps (not shown) are stored under an aircraft recovery unit base 18 and are spaced every few feet for easy access to disembark the unit. Cell deflation connections 74 are spaced every few feet on an aircraft recovery unit 18 as well. These connections receive the pneumatic pressure/vacuum hoses 48 from the guide track hatch 14. A crossover ramp 75 is shown on FIG. 11. It is carried on rescue vehicles and deployed after cessation of movement of an aircraft recovery unit 18.

From the description of an aircraft crash damage limitation system listed above, there are many evident advantages to this system:

(a) The aircraft crash damage limitation system is stored underground for all-weather deployment and is heated to provide that service.
  (b) The aircraft recovery unit is supported by a guide track on two sides which itself is supported by a reinforced concrete bunker system.

(c) This system utilizes the latest technology in acceleration and braking via a magnetic flux system. This has been tested and placed in commercial use by roller coaster design engineers.

(d) This system is provided with a backup means for propulsion and braking as a safety feature. Redundancy of systems creates more reliability.

(e) Capture cells located atop a recovery unit provide both aircraft support and fire suppression.

(f) A locator system on the aircraft recovery unit aids a pilot in making the critical landing maneuver over the aircraft recovery unit.

Description of Operation

In FIGS. 1 and 2 an aircraft approaching a facility with a runway declares that an emergency landing is required. The control tower or a designated entity deploys an aircraft crash damage limitation system by device connecting the tower with the system. FIGS. 1 and 2 show the system in a bunkered position with normal air traffic possible. As deployment begins, the guide track hatches 14 raise under the pressure of the guide track 52 pressing from below (FIG. 6). The guide track hatches 14 are constructed in such a manner to be pushed out of the guide track bunker 22 with no interference. Should this be a cold weather deployment, the system heating apparatus (encircled H) will have kept operating components from seizing in the cold. The guide track 52 length is dependent on the use applied, but would likely traverse several thousand feet on both sides of a runway 21.

The guide track assembly 52 is raised via guide track lift cylinders 38. The guide track 52 rises to a position so that two thirds of its height extends beyond the plane of the runway surface. This enables the hinged track doors 14 to fall back and expose the underlying guide track 52. The guide track lift cylinders 38 then decompress to the storage position. This allows for retrieval of an aircraft recovery unit 18 from the aft apparatus area 12.

At the same time that the guide track hatch 14 is being deployed, the aft deployment hatch 13 over the apparatus equipment area 12 is rising (FIG. 4). Several heavy duty lift cylinders for the aft hatch 38 raise the door. The angle of hatch ascent and the strength of the lift cylinders 38 make it possible for aircraft landing gear to inadvertently strike said door without great harm. The aft hatch 13 will close upon deployment of the aircraft recovery unit 18 to cover the open space at the runway approach.

FIGS. 4 and 5 illustrate the system in operation with deployment hatches open. Several functions are now taking place simultaneously. The aircraft recovery unit 18 is being sent out of the apparatus area 12 by use of a winch and cable system. An aircraft recovery unit deployment winch (encircled W5), which is located at the center, rear of the apparatus equipment area 12, uses a cable 24 and forward recovery unit pulley 28 to effect egress. A series of paddles (not shown) are mounted on the recovery unit deployment cable 24. They line up with paddles under the aircraft recovery unit 18. The paddles are upright with a one-way hinge to allow deployment but spring back to accomplish the return of the aircraft recovery unit 18 to the apparatus equipment area 12. A recovery unit storage base ramp 20 built into the apparatus equipment area 12 will assist the tire assemblies in egress to the runway 21 and into the guide track 52.

The aircraft recovery unit 18 is now exiting. The guide track 52 is still in a storage position to receive the aircraft recovery units 18 wheel assemblies (FIG. 8). The articulated nature of the aircraft recovery unit 18 is accomplished by hinged areas 32. This allows for the aircraft recovery unit 18 to exit the apparatus equipment area 12 with a minimum lift of the aft deployment hatch 13.

When the aircraft recovery unit 18 is completely out over the runway 21, a charging process takes place for recovery unit functions. FIG. 1 indicates the location of several systems. The foaming hardware center (encircled F), stored in the apparatus equipment area 12, begins charging the aircraft recovery unit foam disbursement cells 69. These cells are located on the upper layer of two cell layers on the recovery unit 42 (FIG. 9). Break-away charging hoses will fill the foam disbursement cells. The hoses will disconnect as the aircraft recovery unit accelerates. Electrical power cables attached to the aircraft recovery unit 18 are also break-away. The capture cells 42 are of variable size and connected for charging purposes in groups of about four with one-way intake valves to prevent system failure upon puncture. The bottom layer of capture cells 42 are filled with inert, non-toxic gas with all but the upper, center three rows being filled with the same gas. The gas charging is done through the gas compressor/vacuum suction apparatus (encircled G).

The systems located on the aircraft recovery unit 18 which operate independently on the runway are in a state of constant charge while in the apparatus equipment area 12. FIG. 9 shows the location of two such systems. An electronic recovery unit locator (encircled EL) is battery operated and in a state of constant charge by the electrical main system (encircled E) located in the apparatus equipment area 12. The electronic recovery unit locator (encircled EL) also powers several strobe lights (not shown) which operate atop the aircraft recovery unit 18. Both the lights and locator assist a pilot in target acquisition.

Once the aircraft recovery unit 18 is out on the runway the guide track 52 rises to an operational position. FIGS. 6 and 7 show both a guide track retaining wall 56 and the guide track 52. The guide track lift cylinders 38 lift the guide track 52 to an area where two thirds of the guide track 52 is above the plane of the runway surface 21. The guide track retaining wall 56 serves as both a storage compartment for the guide track 52 and as a stabilizer for the deployed track. Forces coming against the aircraft recovery unit 18 during an angle strike of an aircraft incoming in distress 57 are absorbed in this area.

The guide track is also supported by a lift cylinder attachment collar 54. The guide track sections 52 are also joined in a tongue and groove manner (not shown) as indicated in FIG. 8. The track section joints 53 are centered on the lift cylinder attachment collar 54. The guide track lift cylinders 38 are charged for operation and controlled by both the gas compressor/vacuum suction (encircled G) and the electrical main including computer hardware/software (encircled E).

By remote command to the electrical main (encircled E), the runway 21 can be foamed. FIG. 6 and 7 detail the location of the foam application nozzles 46. The nozzles are spaced at intervals of several feet to the runway 21 side on each side of the runway. With guide tracks 52 traversing each elongated side of the runway 21, the location of the foam application nozzles 46 allows for complete coverage. The foam is applied under great pressure by the foaming hardware center (encircled F). If only foaming is desired for an event, the guide track assembly 52 can be deployed alone. The runway 21 is then foamed and the guide track 52 serves to retain the foam on the runway by virtue of the tight fit with runway edge. Any fluid runoff into bunkered areas is carried away by an environmental control piping system (encircled EC1).

An aircraft is now on final approach to the emergency runway 21. FIGS. 10 and 11 show such an aircraft. The system has deployed in less than ninety seconds. The runway is being foamed and the acceleration systems are ready for operation. The aircraft recovery unit is accelerated and braked by a main system and a backup system. The main acceleration system is of a magnetic flux technology as used on roller coaster systems. FIG. 5 shows a magnetic flux acceleration/braking bar 44 located under the aircraft recovery unit 18. This is lowered by pneumatic means (not shown) with gas stored on the aircraft recovery unit 18. The magnetic flux acceleration/braking bar 44 is placed over a magnetic flux base 66 upon deployment from the apparatus equipment area 12. Electricity is applied to provide the magnetic propulsion. The aircraft recovery unit 18 can now roll down the runway 21 with tremendous acceleration. Additional space for magnetic guides 45 is shown in FIG. 11. To reduce wind drag on the aircraft recovery unit 18, air deflection shields (not shown) are mounted on the upright fuselage capture sections 60 and 62.

As a backup propulsion and braking system, a winch and cable assembly is shown in FIGS. 3, 3A and 4. A continuous loop cable 25 runs through an aft winch right (encircled W1) forward winch right (encircled W3). An opposite assembly for the other side of the system contains a continuous loop cable 24 and an aft winch left (encircled W2) and a forward winch left (encircled W4). The cable is attached to reinforced obstruction deflectors 40 at the front and rear of the aircraft recovery unit 18 and on each side. The obstruction deflectors 40 can clear intrusive matter away from the moving aircraft recovery unit 18. The winches involved will operate to match the speed of the magnetic flux system or in that absence, as a computer controlled acceleration/braking system of its own merit.

An incoming aircraft in distress 57 is now in imminent contact with the aircraft recovery unit 18. Computer systems, in association with the electronic recovery unit locator (encircled EL), are now guiding the aircraft to a safe landing. For capture stability, the aircraft recovery unit contains a notch at its center for fuselage reception. The strobe lights are mounted on the upright fuselage collar sections 60 and 62 for target acquisition. Like electronic recovery unit locator equipment 63 is mounted in the incoming distressed aircraft 57 for target acquisition. The distressed incoming aircraft 57 moves directly over the aircraft recovery unit 18 and sets down. A remote command can now be given to foam the aircraft exterior via nozzles on the forward operation fuselage collar 62. The fuselage collar foaming control (encircled FC) as given on FIG. 9 performs this function. This system controls a valve to disburse the foam contained under pressure in the foam disbursement cells 69. The weight of the aircraft pressing on the foam disbursement cells 69 also contributes to foam disbursement.

Upon reception of an aircraft in distress 57, computer systems now brake the aircraft recovery unit 18. Any failure of the magnetic flux bars 44 and 66 will result in the cable system engaging. The cables are detachable by a means from the aircraft recovery unit 18. With the aircraft recovery unit at a full stop, the plane can be moved from the runway via the tire assemblies under the unit or left as is with passengers deplaned on the runway 21.

In the event that an aircraft in distress 57 can not be captured in the direction commonly deployed, the aircraft recovery unit 18 can be sent to the opposite end of the runway 21 and operated in reverse. The same magnetic flux technology applies. The reverse operation fuselage collar 60 can be deployed by remote control. The compressed gas/cylinder controls (encircled CG) on the aircraft recovery unit 18 are connected to a compressed gas cylinder on the aircraft recovery unit 18 and is in a state of constant charge. All acceleration/braking systems operate in reverse mode.

The aircraft recovery unit has tire assemblies (several per side in the guide track 52) and all have wheel assembly swivel joints 67 in conjunction with the pneumatic shock absorbers 65. The aircraft recovery unit can be exited from the guide tracks 52 and towed to an area desired with the aircraft and passengers aboard. In addition, several components exist to safely deplane crew and passengers from the runway 21 where the aircraft recovery unit 18 comes to rest.

In deplaning passengers from an aircraft located on the aircraft recovery unit 18, several events must take place. FIG. 6 indicates pneumatic pressure/vacuum hoses 48 stored in short lengths on the underside of the guide track hatch 14. These hoses connect to ports spaced equally on the aircraft recovery unit 18 so as to be receptors of the hoses. The capture cells 42 can be deflated in sections. Deflation will take place by evacuating gas and/or foam from areas a few feet wide and from the outside of the aircraft recovery unit to the center. This operation can take place from either side of the aircraft recovery unit 18. In this manner, small sections can be deflated to ensure aircraft stability on the capture cells 42 and to allow the aircraft emergency chutes to deploy (if so equipped). The pneumatic pressure/vacuum hoses are operated by the gas compressor/vacuum suction control (encircled G) from the apparatus equipment area 12.

When areas of deplaning have been selected, a series of ramps can be deployed to exit passengers from atop the aircraft recovery unit 18. Although the edge of the aircraft recovery unit 18 is only a couple feet above the ground, ramps may be necessary. The pneumatic ramp controls 72 are indicated on FIG. 11.

Any person deplaning on the runway 21 or any rescue personnel wanting access to the runway 21 can use crossover ramps 75 for that purpose (FIG. 11).

These are to be stored on rescue vehicles and deployed as necessary by rescue personnel. The guide tracks 52 are easily crossed in this manner.

CONCLUSIONS, RAMIFICATIONS, AND SCOPE

Accordingly, the reader will see that this aircraft crash damage limitation system has many advantages in safely retrieving aircraft in distress from the skies. The very strength and stability of the members employed to make the system work create a system to be used on aircraft from around the world. Furthermore, this aircraft crash damage limitation system has features making it unique in the flight safety arena:

it is deployable in all weather conditions it provides a safe storage area for involved equipment during non-deployment times an aircraft experiencing external fire can be treated immediately it provides stability and strength for aircraft capture air speed and ground speed are matched to exacting specifications acceleration and braking are superior Although the above description contains many specific calculations, this should not be construed as limiting the scope of the invention, but rather as illustrations of potential manufacturing methods and uses of equipment. The preferred embodiments listed are not all-inclusive. For example, the guide track bunkers can be of varied size as can the guide track itself; the magnetic propulsion system can be mounted in different ways; the recovery cells on the aircraft recovery unit can be made of varied materials, etc.

Thus, the scope of the invention should be determined by the appended claims and their legal equivalents, rather than by the examples given.

I claim:

1. An aircraft crash damage limitation system comprising:

means for deploying an aircraft crash damage limitation system from heated bunkers whereby deployment is possible in all weather conditions, said means allowing normal air traffic patterns whereby aircraft can utilize the runway space during non-deployment, a plurality of guide track hatches rise to expose guide tracks and an aircraft recovery unit, a plurality of bunkers contain supporting equipment as a means to deploy the aircraft crash damage limitation system;

means for accelerating and braking the aircraft recovery unit, said accelerating and braking means including a magnetic field embodied in magnetic flux bars in the guide track and under said aircraft recovery unit, a backup means of acceleration and braking provided by a winch and cable relay, a reverse deployment operation method is embodied in a means in said magnetic field and said backup propulsion and braking methods;

means for controlling aircraft stability during aircraft recovery, said controlling means including the guide tracks seated in reinforced retaining bunkers, shock absorbing tire assemblies located under the aircraft recovery unit, an upright fuselage collar whereby air currents minimize aircraft yaw, a guide track providing tire assembly containment;

means for providing aircraft capture, said capture means including the aircraft recovery unit layered with capture cells and foam disbursement cells, a plurality of said foam disbursement cells filled with fire suppressing foam whereby fire control is applied via nozzles in the upright fuselage collars to an aircraft exterior fuselage, an electronic locator means mounted on the aircraft recovery unit and in the aircraft cockpit whereby exact aircraft positioning is possible weather not withstanding, a plurality of foaming nozzles are provided in the guide track assemblies for runway foaming, said guide tracks forming a barrier along the length of the runway edge thereby containing the disbursed fire suppression foam;

means for providing for passenger egress from the aircraft, said means providing deflation of capture cells on the aircraft recovery unit, a plurality of egress ramps are stored under said aircraft recovery unit and crossover bridges stored on rescue vehicles to traverse the area over the top of the guide tracks whereby passengers and rescue personnel are not obstructed in passage over the guide tracks.

2. The aircraft recovery unit of claim 1 wherein the aircraft recovery unit and associated guide tracks and deployment method are stored underground below a plane of the runway surface employing a means for heating the bunkers for operation in all weather conditions.

3. The aircraft crash damage limitation system of claim 1 wherein the aircraft recovery unit has the width of the deploying runway and a length determined by the possible dimensions of aircraft to land at a facility.

4. The aircraft recovery unit of claim 2 wherein a plurality of capture cells are located on an aluminum I-beam frame in the preferred embodiment and said cells inflated with non-toxic, inert gas or fire suppressing foam to support an aircraft in distress and to apply said foam to the exterior aircraft fuselage components by a plurality of nozzles located on upright fuselage collar supports.

5. The aircraft recovery unit of claim 2 wherein an electronic locator means is mounted on said recovery unit with a beacon to aligning the aircraft and aircraft recovery unit movement.

6. The aircraft recovery unit of claim 2 wherein notched forward and aft fuselage collars are mounted on said aircraft recovery unit whereby aircraft capture stability is embodied.

7. The aircraft recovery unit of claim 2 wherein aircraft recovery unit tires and tire support assemblies are juxtaposed under said aircraft recovery unit whereby weight is supported equally with rows of tire assemblies aligned at each side edge to be guided by guide track assemblies.

8. The tire support assemblies of claim 7 wherein shock absorbing shafts are mounted by a means under the aircraft recovery unit whereby bounce is significantly reduced upon aircraft capture.

9. The guide tracks of claim 1 wherein said guide tracks are constructed of lightweight aluminum in the preferred embodiment with a center slot to receive a tire support assembly and top edges curved inward to prevent tire escape and runway foaming nozzles spaced equally along the runway side of said guide tracks and said nozzles juxtaposed with the nozzles of the opposite guide track assembly.

10. The guide tracks of claim 9 wherein said guide tracks are supported by a reinforced guide track bunker and by pneumatic cylinders in the preferred embodiment and attached to the bunker with attachment collars connecting the guide tracks to the support cylinders.

11. The guide tracks of claim 9 wherein the magnetic propulsion means is mounted in said guide track with backup propulsion and braking system cables guided by a method under and over said magnetic propulsion means whereby the aircraft recovery unit is attached and receives movement commands.

12. The aircraft recovery unit of claim 2 wherein a winch and cable propulsion and braking method is embodied by fore and aft winches on both sides of the deploying runway with a continuous loop cable traversing the distance and attached to the aircraft recovery unit.

13. The aircraft recovery unit of claim 2 wherein a magnetic propulsion and braking means is mounted on the underside and located over the top, center opening of the guide track assembly whereby the magnetic propulsion means can be lowered from the underside of the aircraft recovery unit and secured to its base equivalent.

14. The aircraft recovery unit of claim 2 wherein a means is provided to deflate capture cells in specific sections whereby aircraft emergency chutes can be deployed and a means to deploy exit ramps in a plurality of locations on each side of said aircraft recovery unit for passenger exit from the surface of the aircraft recovery unit.

* * * * *